United States Patent
Gao

(10) Patent No.: US 9,882,615 B2
(45) Date of Patent: Jan. 30, 2018

(54) METHOD, SYSTEM, AND DEVICE FOR TRANSMITTING CODING INSTRUCTION INFORMATION AND FOR DETERMINING PRE-CODING MATRIX

(71) Applicant: China Academy of Telecommunications Technology, Beijing (CN)

(72) Inventor: Qiubin Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 60 days.

(21) Appl. No.: 14/434,400

(22) PCT Filed: Oct. 18, 2013

(86) PCT No.: PCT/CN2013/085504
§ 371 (c)(1),
(2) Date: Apr. 8, 2015

(87) PCT Pub. No.: WO2014/059944
PCT Pub. Date: Apr. 24, 2014

(65) Prior Publication Data
US 2015/0270881 A1    Sep. 24, 2015

(30) Foreign Application Priority Data
Oct. 19, 2012 (CN) .......................... 2012 1 0402573

(51) Int. Cl.
*H04B 7/04*    (2017.01)
*H04B 7/0456*    (2017.01)
(Continued)

(52) U.S. Cl.
CPC ......... *H04B 7/0456* (2013.01); *H04B 7/0478* (2013.01); *H04B 7/06* (2013.01);
(Continued)

(58) Field of Classification Search
CPC .. H04B 7/0456; H04B 7/0617; H04B 7/0619; H04B 7/0663; H04B 7/06; H04B 7/0634;
(Continued)

(56) References Cited

U.S. PATENT DOCUMENTS

2010/0045494 A1    2/2010 Clerckx et al.
2011/0216846 A1    9/2011 Lee et al.
(Continued)

FOREIGN PATENT DOCUMENTS

CN    101834708 A    9/2010
CN    101867461 A    10/2010
(Continued)

OTHER PUBLICATIONS

The Extended European Search Report dated Nov. 10, 2015 in the EP counterpart application (13847320.2).
International Search Report for PCT/CN2013/085504.

*Primary Examiner* — Paul H Masur
*Assistant Examiner* — Michael Phillips
(74) *Attorney, Agent, or Firm* — Kilpatrick Townsend & Stockton LLP

(57) ABSTRACT

A method, system, and device for transmitting coding instruction information, for use in solving the problem found in the prior art that, as current codebooks are designed for horizontal beamforming/pre-coding, direct application of the codebooks to a three-dimensional beamforming/pre-coding technology causes performance degradation. The method of embodiments of the present invention comprises: a user equipment determines and transmits to a network side first pre-coding instruction information and second pre-coding instruction information, where a first component pre-coding matrix is a block diagonal matrix, a submatrix on the diagonal is equal to the Kronecker product of two matrices, a second component pre-coding matrix is constituted by a weighted column selection vector, with the
(Continued)

801 — A network-side devices receive a first pre-coding indicator and a second pre-coding indicator from a UE 802 — The network-side device determines a pre-coding matrix from the first pre-coding indicator and the second pre-coding indicator, the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer exception of a P-number of nonzero elements, the remainder of the weighted column selection vector is all zeros, and P is a positive integer. Employment of the method of the embodiments of the present invention increases the performance of the three-dimensional beamforming/pre-coding technology.

8 Claims, 5 Drawing Sheets

(51) Int. Cl.
      *H04B 7/06*       (2006.01)
      *H04L 1/06*       (2006.01)
(52) U.S. Cl.
    CPC ......... *H04B 7/0617* (2013.01); *H04B 7/0619* (2013.01); *H04B 7/0634* (2013.01); *H04B 7/0639* (2013.01); *H04B 7/0663* (2013.01); *H04L 1/06* (2013.01)

(58) Field of Classification Search
    CPC .. H04B 7/0639; H04B 7/0478; H04B 7/0471; H04L 1/06
    See application file for complete search history.

(56) References Cited

U.S. PATENT DOCUMENTS

| 2011/0305263 | A1 | 12/2011 | Jöngren et al. |
| 2016/0043789 | A1* | 2/2016 | Wang ................... H04B 7/0469 |
| | | | 370/329 |

FOREIGN PATENT DOCUMENTS

| CN | 101969366 A | 2/2011 |
| WO | 20111051914 A1 | 5/2011 |
| WO | 2011/150549 A1 | 12/2011 |
| WO | 2012/008710 A2 | 1/2012 |

* cited by examiner

METHOD, SYSTEM, AND DEVICE FOR TRANSMITTING CODING INSTRUCTION INFORMATION AND FOR DETERMINING PRE-CODING MATRIX

This application is a US National Stage of International Application No. PCT/CN2013/085504, filed on Oct. 18, 2013, designating the United States and claiming claims priority to Chinese Patent Application No. 201210402573.8, filed with the Chinese Patent Office on Oct. 19, 2012 and entitled "Method, system and device for transmitting a coding indicator and determining a pre-coding matrix", which is hereby incorporated by reference in its entirety.

FIELD

The present invention relates to the field of wireless communications and particularly to a method, system and device for transmitting a coding indicator and determining a pre-coding matrix.

BACKGROUND

Closed-loop pre-coding has been introduced in the Long Term Evolution (LTE) Release 8 (Rel-8) to improve the spectrum efficiency. Closed-loop pre-coding essentially requires the same set of pre-coding matrixes, referred to as a codebook, to be stored at both an evolved Node B (eNB) and a User Equipment (UE). The UE estimates channel information from the cell common pilot and then selects a pre-coding matrix from the codebook according to some criterion which can be the maximizing mutual information, the maximizing output signal to interference and noise ratio, etc. The UE feeds back an index of the selected pre-coding matrix in the codebook to the eNB over an uplink channel, and the index is referred to as a Pre-coding Matrix indicator (PMI). The eNB can determine, from the value of the received index, the pre-coding matrix to be used for the UE. The pre-coding matrix reported by the UE can be considered as a quantized value of channel state information.

In an existing cellular system, an array of antennas of an eNB is typically arranged horizontally as illustrated in FIG. 1 and FIG. 2. A beam at a transmitting end, the eNB, can be adjusted only horizontally with a common vertical down tilt angle for every UE, so various beam-forming/pre-coding technologies are generally applied based upon channel information in horizontal dimension. In fact, a radio signal propagates in three dimensions in space, and the performance of the system may not be optimized with this common vertical down tilt angle. Adjusting of the beam in vertical direction may be of great significance to the improved performance of the system.

Along with the development of antenna technologies, an array of active antennas with each array element being separately controllable has emerged in the industry as illustrated in FIG. 3A and FIG. 3B. Dynamic adjusting of a beam in vertical dimension becomes possible with this array of antennas. 3D beam-forming/pre-coding may be performed in a Frequency Division Duplex (FDD) system based upon channel state information reported by a UE, possibly using a codebook as conventionally used in the LTE Rel-8 system. However the existing codebook is designed for horizontal beam-forming/pre-coding, so a direct application thereof to 3D beam-forming/pre-coding may degrade the performance.

In summary, the existing codebook is designed for horizontal beam-forming/pre-coding, so a direct application thereof to 3D beam-forming/pre-coding may degrade the performance.

SUMMARY

Embodiments of the invention provide a method, system and device for transmitting a coding indicator and determining a pre-coding matrix so as to address such a problem in the prior art that the existing codebook is designed for horizontal beam-forming/pre-coding, so a direct application of the existing codebook to 3D beam-forming/pre-coding may degrade the performance.

An embodiment of the invention provides a method for transmitting a coding indicator, the method including:

determining, by a UE, a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer; and transmitting, by the UE, the first pre-coding indicator and the second pre-coding indicator to the network side.

An embodiment of the invention provides a method for determining a pre-coding matrix, the method including:

receiving, by a network-side device, a first pre-coding indicator and a second pre-coding indicator from a UE; and determining, by the network-side device, a pre-coding matrix from the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer.

An embodiment of the invention provides a UE for transmitting a coding indicator, the UE including:

a first determining module configured to determine a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer; and a transmitting module configured to transmit the first pre-coding indicator and the second pre-coding indicator to the network side.

An embodiment of the invention provides a network-side device for determining a pre-coding matrix, the network-side device including:

a receiving module configured to receive a first pre-coding indicator and a second pre-coding indicator from a UE; and a second determining module configured to determine a pre-coding matrix from the first pre-coding indicator and the second pre-coding indicator, wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer.

An embodiment of the invention provides a system for determining a pre-coding matrix, the system including:

a UE configured to determine a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer; and a network side device configured to receive the first pre-coding indicator and the second pre-coding indicator from the UE; and to determine the pre-coding matrix from the first pre-coding indicator and the second pre-coding indicator.

In the embodiments of the invention, the UE determines the first pre-coding indicator and the second pre-coding indicator, the first pre-coding indicator and the second pre-coding indicator correspond to the pre-coding matrix which is equal to a matrix as a function of the first component pre-coding matrix and the second component pre-coding matrix, the first component pre-coding matrix corresponding to the first pre-coding indicator is a block diagonal matrix with sub-matrixes on the diagonal being a Kronecker product of two matrixes, and the second component pre-coding matrix corresponding to the second pre-coding indicator is composed of weighted column selection vectors, elements of the weighted column selection vector are zeros other than P non-zero elements with P being a positive integer. The constructed pre-coding matrix can better match a space channel of 3D beam-forming to thereby improve the performance of 3D beam-forming/pre-coding.

BRIEF DESCRIPTION OF THE DRAWINGS

In order to make the technical solutions according to the embodiments of the invention more apparent, the drawings to which reference is made in the description of the embodiments will be described below briefly, and evidently the drawings described below are merely illustrative of some of the embodiments of the invention, and those ordinarily skilled in the art can further derive other drawings from these drawings without any inventive effort. In the drawings.

DETAILED DESCRIPTION OF THE EMBODIMENTS

In the embodiments of the invention, a UE determines a first pre-coding indicator and a second pre-coding indicator, where the first pre-coding indicator and the second pre-coding indicator correspond to a pre-coding matrix which is equal to a matrix as a function of a first component pre-coding matrix and a second component pre-coding matrix, the first component pre-coding matrix corresponding to the first pre-coding indicator is a block diagonal matrix with sub-matrixes on the diagonal being a Kronecker product of two matrixes, and the second component pre-coding matrix corresponding to the second pre-coding indicator is composed of weighted column selection vectors, elements of the weighted column selection vector are zeros other than P non-zero elements. The pre-coding matrix can be constructed to better match a space channel of 3D beam-forming to thereby improve the performance of 3D beam-forming/pre-coding.

The embodiments of the invention will be described below in further details with reference to the drawings.

In the following description, firstly an implementation with cooperation of the network side and the UE side will be described, and then implementations at the network side and the user equipment side will be described respectively, but this will not suggest required cooperation of both the sides for an implementation. In fact, problems encountered respectively at the network side and the user equipment side will also be addressed in the separate implementations at the network side and the user equipment side, although a better technical effect can be achieved in the implementation with cooperation of both the sides.

Figure 1:
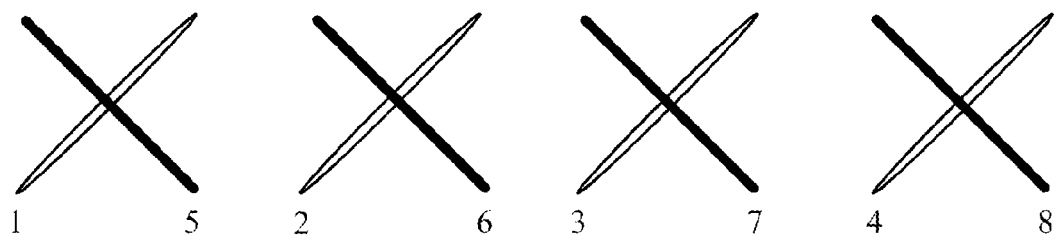
FIG. 1 illustrates a schematic diagram of horizontally arranged dual-polarized antennas in the prior art.
Figure 2:
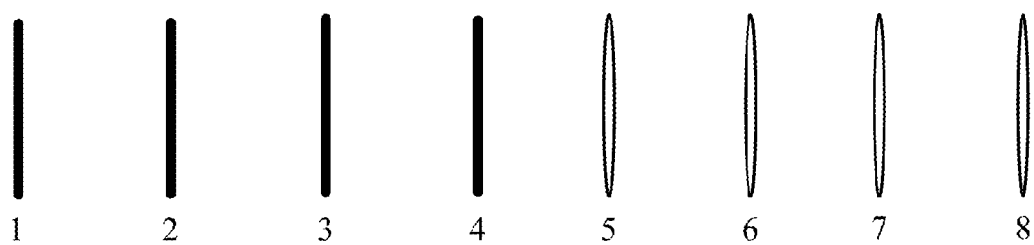
FIG. 2 illustrates a schematic diagram of horizontally arranged linear-array antennas in the prior art.
Figure 3A:
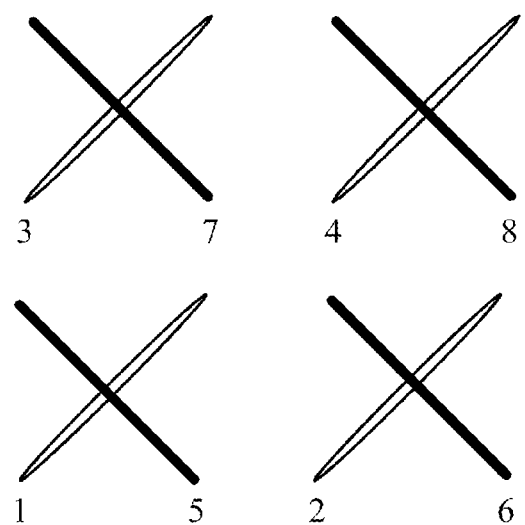
FIG. 3A illustrates a schematic diagram of horizontally 2D-arranged dual-polarized antennas in the prior art.
Figure 3B:
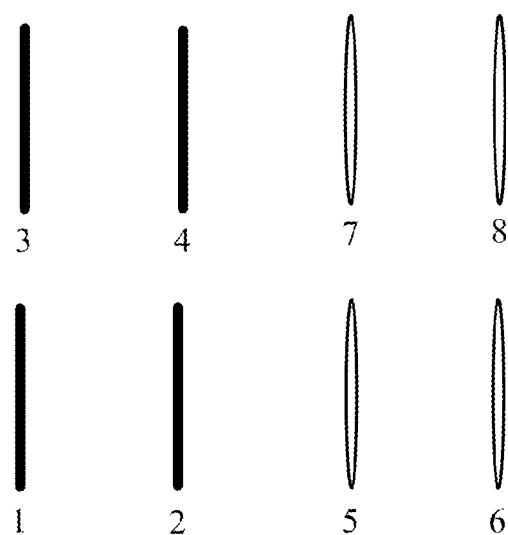
FIG. 3B illustrates a schematic diagram of vertically 2D-arranged linear-array antennas in the prior art.
Figure 4:
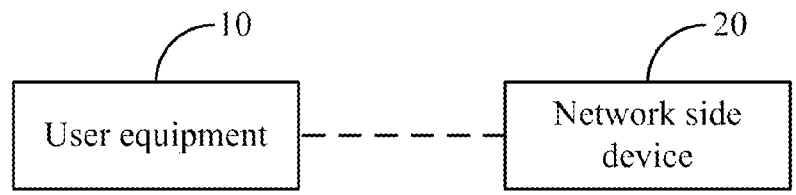
FIG. 4 illustrates a schematic structural diagram of a system for determining a pre-coding matrix according to an embodiment of the invention.

As illustrated in FIG. 4, a system for determining a pre-coding matrix according to an embodiment of the invention includes a UE 10 and a network side device 20.

The UE 10 is configured to determine a first pre-coding indicator and a second pre-coding indicator and to transmit the first pre-coding indicator and the second pre-coding indicator to the network side, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, weighted column selection vector are zeros other than P non-zero elements with P being a positive integer; and The network side device 20 is configured to receive the first pre-coding indicator and the second pre-coding indicator from the UE; and to determine the pre-coding matrix according to the first pre-coding indicator and the second pre-coding indicator.

Preferably P is 2.

In an implementation, the UE 10 can determine the first pre-coding indicator and the second pre-coding indicator in a number of approaches, several of which will be listed below:

In a first approach, the UE 10 selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Particularly the UE 10 estimates a channel of each antenna port to the UE 10 according to a pilot symbol transmitted by the network-side device 20, each antenna port corresponds to one or more physical antennas; and Then the UE 10 selects the first component pre-coding matrix from the set of first component pre-coding matrixes, and selects the second component pre-coding matrix from the set of second component pre-coding matrixes, according to the estimated channel.

The first component pre-coding matrix can be determined by maximizing a mutual information or maximizing an output signal to interference and noise ratio or maximizing an output energy. The first component pre-coding matrix can be determined by maximizing an output energy in the equation of:

$$W_1 = \underset{V \in C_1}{\mathrm{argmax}} \|H_1 V\|^2,$$

Here, $C_1$ represents a set of possible first component pre-coding matrixes, and $H_1$ represents a part of a channel matrix of the network-side device 20 to the UE 10, particularly a part thereof corresponding to the first component pre-coding matrix, e.g., channels of dual-polarized antennas in the same polarization direction or channels of a half of antennas in an array of co-polarized antennas.

The second component pre-coding matrix can be determined by maximizing a mutual information or maximizing an output signal to interference and noise ratio or maximizing an output energy. The first component pre-coding matrix can be determined by maximizing an output energy in the equation of:

$$W_2 = \underset{V \in C_2}{\mathrm{argmax}} \|H W_1 V\|^2,$$

$C_2$ represents a set of possible second component pre-coding matrixes, H represents the channel matrix of the network-side device 20 to the UE 10, and $W_1$ represents the determined first component pre-coding matrix.

For the first approach, the UE 10 can transmit the first pre-coding indicator and the second pre-coding indicator to the network-side device 20 over the uplink channel at different time with different time granularities and frequency granularities or at the same time.

In an implementation, the first component pre-coding matrix in the embodiment of the invention is a block diagonal matrix, and the first component pre-coding matrix is expressed in one of Equation 1 to Equation 4 below:

$$W_1 = \begin{bmatrix} Z \otimes X & 0 \\ 0 & Z \otimes X \end{bmatrix}; \qquad \text{Equation 1}$$

$$W_1 = \begin{bmatrix} Z \otimes X & 0 \\ 0 & Z \otimes XA \end{bmatrix}; \qquad \text{Equation 2}$$

$$W_1 = \begin{bmatrix} Z \otimes X & 0 \\ 0 & ZB \otimes X \end{bmatrix}; \text{ and} \qquad \text{Equation 3}$$

$$W_1 = \begin{bmatrix} Z \otimes X & 0 \\ 0 & ZB \otimes XA \end{bmatrix}. \qquad \text{Equation 4}$$

$W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$-dimension, the values of which can be a function of X or fixed values; and B represents a diagonal matrix with $M_V \times M_V$ dimension, the values of which can be a function of Z or fixed values, $D_H$ represents a positive integer, and $M_H$, $D_V$ and $M_V$ represent positive integers. Preferably $D_H$ is a half of the number of horizontal antennas.

In the first approach, the set of first component pre-coding matrixes is composed of first component pre-coding matrixes expressed in one of Equation 1 to Equation 4 above.

Preferably X represents an element in a set of horizontal or vertical beam-forming matrixes $\{X_p : p=0, 1, \ldots, N_H-1\}$, $X=X_k$ and $0 \le k \le N_H-1$; and Z represents an element in a set of vertical or horizontal beam-forming matrixes $\{Z_q : q=0, 1, \ldots, N_V-1\}$, $Z=Z_n$ and $0 \le n \le N_V-1$, and $N_H$ and $N_V$ are positive integers.

Preferably X represents a Discrete Fourier Transform (DFT) matrix or a part of the DFT matrix, e.g., first $D_H$ rows and consecutive $M_H$ columns in an L-point DFT matrix, i.e., $$[X_k]_{it} = e^{j\frac{2\pi i((t+s_k) \bmod L)}{L}} \text{ or } [X_k]_{it} = e^{-j\frac{2\pi i((t+s_k) \bmod L)}{L}}$$

with $i=0, 1, \ldots, D_H-1$; $t=0, 1, \ldots M_H-1$, $S_k$ represents the column number of the zero-th column of $X_k$ in the DFT matrix. Particularly L=4, 8, 16, 32, 64, etc., and $s_k=k$ or $s_k=2k$ or $s_k=4k$, etc. If the value of A is a function of X, and $A_k$ depends on $X_k$, then $$[A_k]_{ii} = e^{j\frac{2\pi((i+s_k) \bmod L)D_H}{L}} \text{ or } [A_k]_{ii} = e^{-j\frac{2\pi((i+s_k) \bmod L)D_H}{L}}.$$

Z represents the DFT matrix or a part of the DFT matrix, e.g., first $D_V$ rows and consecutive $M_V$ columns in the L-point DFT matrix, i.e., $$[Z_n]_{it} = e^{j\frac{2\pi i((t+s_n) \bmod L)}{L}} \text{ or } [Z_n]_{it} = e^{-j\frac{2\pi i((t+s_n) \bmod L)}{L}}$$

with $i=0, 1, \ldots, D_V-1$; $t=0, 1, \ldots M_V-1$, wherein $S_n$ represents the column number of the zero-th column of $Z_n$ in the DFT matrix. Particularly $L=4, 8, 16, 32, 64$, etc., and $s_n=n$ or $s_n=2n$ or $s_n=4n$, etc. If the value of B is a function of Z, and $B_n$ depends on $Z_n$, then $$[B_n]_{ii} = e^{j\frac{2\pi((i+s_n)\bmod L)D_V}{L}} \text{ or } [B_n]_{ii} = e^{-j\frac{2\pi((i+s_n)\bmod L)D_V}{L}}.$$

In the first approach, preferably the UE 10 can determine the first pre-coding indicator in Equation 5 or Equation 6 below after determining the first component pre-coding matrix:

$$i_1 = n \times N_H + k \quad \text{Equation 5; and}$$

$$i_1 = k \times N_V + n \quad \text{Equation 6,}$$

$i_1$ represents the first pre-coding indicator.

In the first approach, preferably the UE 10 can determine the first pre-coding indicator corresponding to the first component pre-coding matrix according to a preset correspondence relationship between the first component pre-coding matrix and the first pre-coding indicator after determining the first component pre-coding matrix.

The correspondence relationship between the first component pre-coding matrix and the first pre-coding indicator can be preset as needed. In an implementation, the correspondence relationship can be specified in a protocol or can be signaled in higher-layer signaling.

In an implementation, the second component pre-coding matrix is the product of a $(2M_HM_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

$W_2$ represents the second component pre-coding matrix; $e_{k_i}$ represents a column vector with the length of $M_HM_V$ and the $k_i$-th element being 1 and all the other elements being 0; and $\alpha_i$ represents a complex scalar with a modulus being 1, $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

j represents a pure imaginary number, e.g., $$j = e^{j\frac{\pi}{2}}.$$

Here r represents the number of columns in the pre-coding matrix, which is also referred to as a rank.

Particularly the second component pre-coding matrix $W_2$ is selected from a set (a codebook), and the second pre-coding indicator corresponds to an element in the set. For example, for a codebook with r=1, there is a set of $$W_2, \left\{ \begin{bmatrix} e_i \\ \alpha e_i \end{bmatrix} : i = 0, 1, \ldots, M_HM_V - 1; \alpha = 1, -1, e^{-j\frac{\pi}{2}}, e^{j\frac{\pi}{2}} \right\},$$

and $e_i$ represents a column vector with the length of $M_HM_V$ and the i-th element being 1 and all the other elements being 0. For example, for a codebook with r=2, there is a set of $$W_2, \left\{ \begin{bmatrix} e_i & e_i \\ e_i & \alpha e_i \end{bmatrix} : i = 0, 1, \ldots, M_HM_V - 1; \alpha = -1 \right\},$$

or the set of $W_2$ can be a subset of a larger set $$\left\{ \begin{bmatrix} e_i & e_k \\ \alpha_1 e_i & \alpha_2 e_k \end{bmatrix} : i = 0, 1, \ldots, M_HM_V - 1; k = 0, 1, \ldots, \right.$$

$$\left. M_HM_V - 1; \alpha_1 = 1, -1, e^{j\frac{\pi}{2}}, e^{-j\frac{\pi}{2}}; \alpha_2 = 1, -1, e^{j\frac{\pi}{2}}, e^{-j\frac{\pi}{2}} \right\}.$$

Generally a codebook with the rank r can be a subset of a set $$\left\{ \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} : k_i = 0, 1, \ldots, \right.$$

$$\left. M_HM_V - 1; \alpha_i = e^{j\frac{2\pi t}{T}}, t = 0, 1, \ldots, T-1; i = 1, \ldots, r \right\},$$

and preferably T=4.

In the first approach, preferably the UE 10 can determine the second pre-coding indicator corresponding to the second component pre-coding matrix according to a preset correspondence relationship between the second component pre-coding matrix and the second pre-coding indicator after determining the second component pre-coding matrix.

The correspondence relationship between the second component pre-coding matrix and the second pre-coding indicator can be preset as needed. In an implementation, the correspondence relationship can be specified in a protocol or can be signaled in higher-layer signaling.

In an implementation, the pre-coding matrix is expressed in one of Equation 7 to Equation 10 below:

$$W = W_1 \cdot W_2 = \begin{bmatrix} Z \otimes X & 0 \\ 0 & Z \otimes X \end{bmatrix} \begin{bmatrix} Y_1 & \Lambda & Y_r \\ \alpha_1 Y_1 & \Lambda & \alpha_r Y_r \end{bmatrix} M; \quad \text{Equation 7}$$

$$W = W_1 \cdot W_2 = \begin{bmatrix} Z \otimes X & 0 \\ 0 & Z \otimes (XA) \end{bmatrix} \begin{bmatrix} Y_1 & \Lambda & Y_r \\ \alpha_1 Y_1 & \Lambda & \alpha_r Y_r \end{bmatrix} M; \quad \text{Equation 8}$$

$$W = W_1 \cdot W_2 = \begin{bmatrix} Z \otimes X & 0 \\ 0 & (ZB) \otimes X \end{bmatrix} \begin{bmatrix} Y_1 & \Lambda & Y_r \\ \alpha_1 Y_1 & \Lambda & \alpha_r Y_r \end{bmatrix} M; \quad \text{Equation 9}$$

and $$W = W_1 \cdot W_2 = \begin{bmatrix} Z \otimes X & 0 \\ 0 & (ZB) \otimes (XA) \end{bmatrix} \begin{bmatrix} Y_1 & \Lambda & Y_r \\ \alpha_1 Y_1 & \Lambda & \alpha_r Y_r \end{bmatrix} M, \quad \text{Equation 10}$$

W represents the pre-coding matrix; $W_1$ represents the first component pre-coding matrix; $W_2$ represents the second component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix with $M_V \times M_V$ dimension, and $D_H$, $M_H$, $D_V$ and $M_V$ represent positive integers; $Y_i$ represents a column vector with the length of $M_H M_V$ and only one element being 1 and all the other elements being 0 (for the purpose of selecting a column in the matrix $Z \otimes X$); $\alpha_i$ represent a phase adjustment coefficient between antennas; r represents the number of columns in the pre-coding matrix; and M represents a power normalization coefficient.

Preferably $$M = \frac{1}{\sqrt{rD_H D_V}}.$$

In an implementation, Equation 7 to Equation 10 can be further transformed so that the second component pre-coding matrix in the equations above is the product of the matrix and M; or M can be a part of the first component pre-coding matrix, that is, the first component pre-coding matrix is the product of the matrix and M, and the second component pre-coding matrix is the matrix; or M can be separate, i.e., $W=W_1 \cdot W_2 \cdot M$.

The UE 10 determines that the product of the first component pre-coding matrix and the second component pre-coding matrix is the pre-coding matrix, i.e., $W=W_1 \cdot W_2$.

In the first approach, if the UE 10 selects a plurality of first component pre-coding matrixes from the set of first component pre-coding matrixes and selects one second component pre-coding matrix from the set of second component pre-coding matrixes, then the UE 10 can select one of the plurality of first component pre-coding matrixes according to one of Equation 7 to Equation 10; or if the UE 10 selects a plurality of second component pre-coding matrixes from the set of second component pre-coding matrixes and selects one first component pre-coding matrix from the set of first component pre-coding matrixes, then the UE 10 can select one of the plurality of second component pre-coding matrixes according to one of Equation 7 to Equation 10.

In a second approach, the UE 10 determines at least one pre-coding matrix; determines first pre-coding indicator and second pre-coding indicator corresponding to the at least one pre-coding matrix according to a correspondence relationship between the first pre-coding indicator, the second pre-coding indicator and the pre-coding matrix; and determines that one of the determined first pre-coding indicator and one of the determined second pre-coding indicator are the first pre-coding indicator and the second pre-coding indicator to be transmitted to the network side.

If the UE 10 determines a plurality of pre-coding matrixes, then the first pre-coding indicators corresponding to the plurality of pre-coding matrixes determined by the UE are the same.

If the UE 10 determines a plurality of pre-coding matrixes, then the second pre-coding indicators corresponding to the plurality of pre-coding matrixes determined by the UE are different.

The at least one pre-coding matrix determined by the UE 10 is equal to a function of the first component pre-coding matrix and the second component pre-coding matrix. Particularly the at least one pre-coding matrix determined by the UE 10 is the product of the first component pre-coding matrix and the second component pre-coding matrix.

The equations in which the first component pre-coding matrix and the second component pre-coding matrix are expressed, and the relationship between the pre-coding matrix, and the first component pre-coding matrix and the second component pre-coding matrix, in the first approach above can also be applicable to the second approach.

The network-side device 20 can determine the pre-coding matrix according to the first pre-coding indicator and the second pre-coding indicator upon reception of the first pre-coding indicator and the second pre-coding indicator from the UE in a number of approaches, several of which will be listed below:

In a first approach, the network-side device 20 determines the first component pre-coding matrix corresponding to the first pre-coding indicator and determines the second component pre-coding matrix corresponding to the second pre-coding indicator; and The network-side device 20 determines the pre-coding matrix in one of Equation 7 to Equation 10.

The network-side device 20 determines the first component pre-coding matrix corresponding to the first pre-coding indicator in one of Equation 1 to Equation 4.

The network-side device 20 receives $i_1$ and determines n and k by equation $n=\lceil i_1/N_H \rceil$; $k=i_1 \bmod N_H$ or $k=\lceil i_1/N_V \rceil$; $n=i_1 \bmod N_V$, and then can determine X, A, B and Z according to n and k and substitute X, A, B and Z into one of Equation 1 to Equation 4 to thereby determine the first component pre-coding matrix corresponding to the first pre-coding indicator.

Particularly $n=\lceil i_1/N_H \rceil$; $k=i_1 \bmod N_H$ or $k=\lceil i_1/N_V \rceil$; $n=i_1 \bmod N_V$ combined with Equation 1 to Equation 4, network-side device 20 can determine the first component pre-coding matrix corresponding to the first pre-coding indicator in the equation below:

$$W_1 = f(i_1) = \begin{bmatrix} Z_n \otimes X_k & 0 \\ 0 & Z_n \otimes X_k \end{bmatrix},$$

$$n = \lceil i_1/N_H \rceil; k = i_1 \bmod N_H; \text{ or}$$

$$W_1 = f(i_1) = \begin{bmatrix} Z_n \otimes X_k & 0 \\ 0 & Z_n \otimes (X_k A_k) \end{bmatrix},$$

$$n = \lceil i_1/N_H \rceil; k = i_1 \bmod N_H; \text{ or}$$

$$W_1 = f(i_1) = \begin{bmatrix} Z_n \otimes X_k & 0 \\ 0 & (Z_n B_n) \otimes X_k \end{bmatrix},$$

$$n = \lceil i_1/N_H \rceil; k = i_1 \bmod N_H; \text{ or}$$

$$W_1 = f(i_1) = \begin{bmatrix} Z_n \otimes X_k & 0 \\ 0 & (Z_n B_n) \otimes (X_k A_k) \end{bmatrix},$$

$$n = \lceil i_1/N_H \rceil; k = i_1 \bmod N_H; \text{ or}$$

$$W_1 = f(i_1) = \begin{bmatrix} Z_n \otimes X_k & 0 \\ 0 & Z_n \otimes X_k \end{bmatrix},$$

$$k = \lceil i_1/N_V \rceil; n = i_1 \bmod N_V; \text{ or}$$

$$W_1 = f(i_1) = \begin{bmatrix} Z_n \otimes X_k & 0 \\ 0 & Z_n \otimes (X_k A_k) \end{bmatrix}, k = \lceil i_1/N_V \rceil;$$

$$n = i_1 \bmod N_V; \text{ or}$$

$$W_1 = f(i_1) = \begin{bmatrix} Z_n \otimes X_k & 0 \\ 0 & (Z_n B_n) \otimes X_k \end{bmatrix}, k = \lceil i_1/N_V \rceil;$$

$$n = i_1 \bmod N_V; \text{ or}$$

$$W_1 = f(i_1) = \begin{bmatrix} Z_n \otimes X_k & 0 \\ 0 & (Z_n B_n) \otimes (X_k A_k) \end{bmatrix}, k = \lceil i_1/N_V \rceil;$$

$$n = i_1 \bmod N_V.$$

Alternatively the network-side device 20 determines the first component pre-coding matrix corresponding to the received first pre-coding indicator according to a preset correspondence relationship between the first component pre-coding matrix and the first pre-coding indicator.

The network-side device 20 determines the second component pre-coding matrix corresponding to the received second pre-coding indicator according to a preset correspondence relationship between the second component pre-coding matrix and the second pre-coding indicator.

If both the UE 10 and the network-side device 20 determine the first component pre-coding matrix in one of Equation 1 to Equation 4, then the particular one equation can be specified in a protocol or can be signaled in higher signaling or can be determined as a result of negotiation between the UE 10 and the network-side device 20 as long as the same equation is applied at the UE 10 and the network-side device 20.

In a second approach, the network-side device 20 determines the pre-coding matrix corresponding to the received first pre-coding indicator and second pre-coding indicator according to a preset correspondence relationship between the first pre-coding indicator, the second pre-coding indicator and the pre-coding matrix.

The correspondence relationship between the first pre-coding indicator, the second pre-coding indicator and the pre-coding matrix can be preset as needed. In an implementation, the correspondence relationship can be specified in a protocol or can be signaled in higher signaling.

The network-side device 20 preprocesses data transmitted by the UE 10 using the determined pre-coding matrix after determining the pre-coding matrix.

The horizontal and vertical dimensions can be interchangeable in the embodiment of the invention.

The network-side device 20 in the embodiment of the invention can be a base station (e.g., a macro base station, a home base station, etc.) or a Relay Node (RN) device or another network-side device.

Figure 5A:
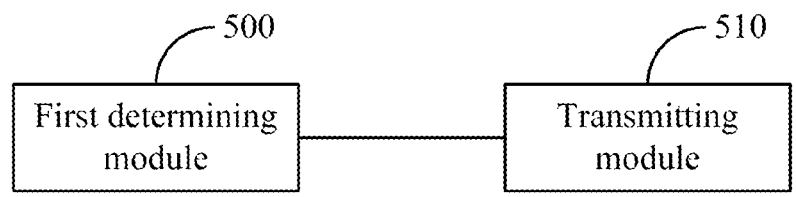
FIG. 5A and FIG. 5B illustrate respectively schematic structural diagrams of a UE in a system for determining a pre-coding matrix according to an embodiment of the invention.

As illustrated in FIG. 5A, a UE in a system for determining a pre-coding matrix according to an embodiment of the invention includes a first determining module 500 and a transmitting module 510, wherein:

The first determining module 500 is configured to determine a first pre-coding indicator and a second pre-coding indicator, the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer; and The transmitting module 510 is configured to transmit the first pre-coding indicator and the second pre-coding indicator to the network side.

Preferably the first determining module 500 selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Preferably the first determining module 500 determines at least one pre-coding matrix; determines the first pre-coding indicator and the second pre-coding indicator corresponding to the at least one pre-coding matrix according to a correspondence relationship between the first pre-coding indicator, the second pre-coding indicator and the pre-coding matrix; and determines that one of the determined first pre-coding indicator and one of the determined second pre-coding indicator are the first pre-coding indicator and the second pre-coding indicator to be transmitted to the network side.

Preferably if the first determining module 500 determines a plurality of pre-coding matrixes, then the first pre-coding indicators corresponding to the determined plurality of pre-coding matrixes are the same.

If the first determining module 500 determines a plurality of pre-coding matrixes, then the second pre-coding indicators corresponding to the determined plurality of pre-coding matrixes are different.

Preferably the first component pre-coding matrix is a block diagonal matrix; and The first component pre-coding matrix is:

$$W_1 = \begin{bmatrix} Z \otimes X & 0 \\ 0 & Z \otimes X \end{bmatrix} \text{ or}$$

$$W_1 = \begin{bmatrix} Z \otimes X & 0 \\ 0 & Z \otimes XA \end{bmatrix} \text{ or}$$

$$W_1 = \begin{bmatrix} Z \otimes X & 0 \\ 0 & ZB \otimes X \end{bmatrix} \text{ or}$$

$$W_1 = \begin{bmatrix} Z \otimes X & 0 \\ 0 & ZB \otimes XA \end{bmatrix},$$

$W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represent a diagonal matrix with $M_V \times M_V$ dimension, and $M_H$, $D_H$, $D_V$ and $M_V$ represent positive integers.

Preferably X represents an element in a set of beam-forming matrixes $\{X_p: p=0, 1, \ldots, N_H-1\}$ with $X=X_k$ and $0 \leq k \leq N_H-1$; and Z represents an element in a set of beam-forming matrixes $\{Z_q: q=0, 1, \ldots, N_V-1\}$ with $Z=Z_n$ and $0 \leq n \leq N_V-1$, $N_H$ and $N_V$ are positive integers.

Preferably the first determining module 500 determines the first pre-coding indicator in the equation of:

$i_1 = n \times N_H + k$ or $i_1 = k \times N_V + n$, $i_1$ represents the first pre-coding indicator.

Preferably the second component pre-coding matrix is the product of a $(2M_H M_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

$W_2$ represents the second component pre-coding matrix; $e_{k_i}$ represents a column vector with the length of $M_H M_V$ and the $k_i$-th element being 1 and all the other elements being 0; and $\alpha_i$ represents a complex scalar with a modulus being 1, and $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

j represents a pure imaginary number.

Preferably the first determining module 50 determines the second pre-coding indicator corresponding to the second component pre-coding matrix according to a preset correspondence relationship between the second component pre-coding matrix and the second pre-coding indicator.

Figure 5B:
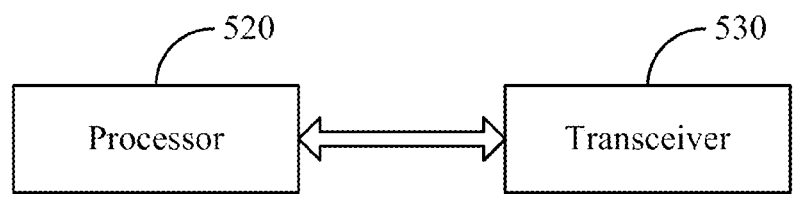

Based upon the same technical idea, as illustrated in FIG. 5B, a UE according to another embodiment of the invention can include:

A processor 520 is configured to determine a first pre-coding indicator and a second pre-coding indicator, the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer; and A transceiver 530 is configured to transmit the first pre-coding indicator and the second pre-coding indicator to the network side.

The first component pre-coding matrix is:

$$W_1 = \begin{bmatrix} Z \otimes X & 0 \\ 0 & Z \otimes X \end{bmatrix}, \text{ or}$$

$$W_1 = \begin{bmatrix} Z \otimes X & 0 \\ 0 & Z \otimes XA \end{bmatrix}, \text{ or}$$

$$W_1 = \begin{bmatrix} Z \otimes X & 0 \\ 0 & ZB \otimes X \end{bmatrix}, \text{ or}$$

$$W_1 = \begin{bmatrix} Z \otimes X & 0 \\ 0 & ZB \otimes XA \end{bmatrix},$$

$W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix $M_V \times M_V$ dimension, $M_H$, $D_H$, $D_V$ and $M_V$ represent positive integers.

X represents an element in a set of beam-forming matrixes $\{X_p: p=0, 1, \ldots, N_H-1\}$ with $X=X_k$ and $0 \le k \le N_H-1$; and Z represents an element in a set of beam-forming matrixes $\{Z_q: q=0, 1, \ldots, N_V-1\}$ with $Z=Z_n$ and $0 \le n \le N_V-1$, and $N_H$ and $N_V$ are positive integers.

The second component pre-coding matrix is the product of a $(2M_H M_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

$W_2$ represents the second component pre-coding matrix; $e_{k_i}$ represents a column vector with the length of $M_H M_V$ and the $k_i$-th element being 1 and all the other elements being 0; and $\alpha_i$ represents a complex scalar with a modulus being 1, and $M_H$ and $M_V$ represent positive integers, and M represent the power normalization coefficient.

Particularly the processor 520 can be configured to select the first component pre-coding matrix from a set of first component pre-coding matrixes and to determine the first pre-coding indicator corresponding to the selected first component pre-coding matrix, and to select the second component pre-coding matrix from a set of second component pre-coding matrixes and to determine the second pre-coding indicator corresponding to the selected second component pre-coding matrix.

Particularly the processor 520 can determine the first pre-coding indicator in the equation of:

$$i_1 = n \times N_H + k \text{ or } i_1 = k \times N_V + n$$

$i_1$ represents the first pre-coding indicator.

Particularly the processor 520 can be configured to determine the second pre-coding indicator corresponding to the second component pre-coding matrix according to a preset correspondence relationship between the second component pre-coding matrix and the second pre-coding indicator.

Particularly the processor 520 can determine that the product of the first component pre-coding matrix and the second component pre-coding matrix is the pre-coding matrix.

Particularly the processor 520 can determine at least one pre-coding matrix; determine first pre-coding indicator(s) and second pre-coding indicator(s) corresponding to the at least one pre-coding matrix according to a correspondence relationship between the first pre-coding indicator, the second pre-coding indicator and the pre-coding matrix; and determine that one of the determined first pre-coding indicator(s) and one of the determined second pre-coding indicator(s) are the first pre-coding indicator and the second pre-coding indicator to be transmitted to the network side.

Furthermore if the processor determines a plurality of pre-coding matrixes, then the first pre-coding indicators corresponding to the determined plurality of pre-coding matrixes are the same; or if the processor determines a plurality of pre-coding matrixes, then the second pre-coding indicators corresponding to the determined plurality of pre-coding matrixes are different.

Figure 6A:
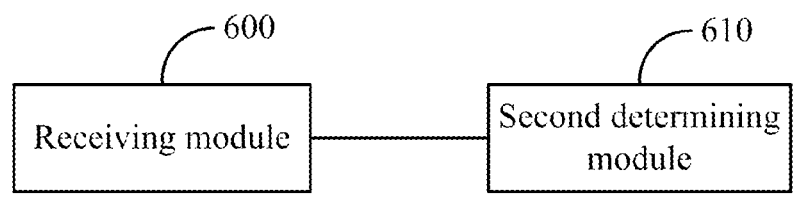
FIG. 6A and FIG. 6B illustrate respectively schematic structural diagrams of a network-side device in a system for determining a pre-coding matrix according to an embodiment of the invention.

As illustrated in FIG. 6A, a network-side device in a system for determining a pre-coding matrix according to an embodiment of the invention includes a receiving module 600 and a second determining module 610, wherein:

The receiving module 600 is configured to receive a first pre-coding indicator and a second pre-coding indicator from a UE; and The second determining module 610 is configured to determine a pre-coding matrix according to the first pre-coding indicator and the second pre-coding indicator, The pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer.

Preferably the second determining module 610 determines the first component pre-coding matrix corresponding to the first pre-coding indicator and determines the second component pre-coding matrix corresponding to the second pre-coding indicator; and determines that the product of the first component pre-coding matrix and the second component pre-coding matrix is the pre-coding matrix.

Preferably the second determining module 610 determines the first component pre-coding matrix corresponding to the first pre-coding indicator in the equation of:

$$W_1 = \begin{bmatrix} Z \otimes X & 0 \\ 0 & Z \otimes X \end{bmatrix}, \text{ or}$$

$$W_1 = \begin{bmatrix} Z \otimes X & 0 \\ 0 & Z \otimes XA \end{bmatrix}, \text{ or}$$

$$W_1 = \begin{bmatrix} Z \otimes X & 0 \\ 0 & ZB \otimes X \end{bmatrix}, \text{ or}$$

$$W_1 = \begin{bmatrix} Z \otimes X & 0 \\ 0 & ZB \otimes XA \end{bmatrix},$$

$W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix with $M_V \times M_V$ dimension, $M_H$, $D_H$, $D_V$ and $M_V$ represent positive integers.

Preferably X represents an element in a set of beam-forming matrixes $\{X_p : p=0, 1, \ldots, N_H-1\}$ with $X=X_k$ and $0 \leq k \leq N_H-1$; and Z represents an element in a set of beam-forming matrixes $\{Z_q : q=0, 1, \ldots, N_V-1\}$ with $Z=Z_n$ and $0 \leq n \leq N_V-1$, $N_H$ and $N_V$ are positive integers, and $n=\lceil i_1/N_H \rceil$; $k=i_1 \bmod N_H$ or $k=\lceil i_1/N_V \rceil$; $n=i_1 \bmod N_V$ and $i_1$ represents the first pre-coding indicator.

Preferably the second determining module 610 determines the second component pre-coding matrix corresponding to the received second pre-coding indicator according to a preset correspondence relationship between the second component pre-coding matrix and the second pre-coding indicator.

Preferably the second component pre-coding matrix is the product of a $(2M_H M_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \wedge & e_{k_r} \\ \alpha_1 e_{k_1} & \alpha_2 e_{k_2} & \wedge & \alpha_r e_{k_r} \end{bmatrix} M,$$

$W_2$ represents the second component pre-coding matrix; $e_{k_i}$ represents a column vector with the length of $M_H M_V$ and the $k_i$-th element being 1 and all the other elements being 0; and $\alpha_i$ represents a complex scalar with a modulus being 1, and $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

where j represents a pure imaginary number.

Preferably the second determining module 610 determines the first component pre-coding matrix corresponding to the received first pre-coding indicator according to a preset correspondence relationship between the first component pre-coding matrix and the first pre-coding indicator.

Preferably the second determining module 610 determines the pre-coding matrix corresponding to the received first pre-coding indicator and second pre-coding indicator according to a preset correspondence relationship between the first pre-coding indicator, the second pre-coding indicator and the pre-coding matrix.

Figure 6B:
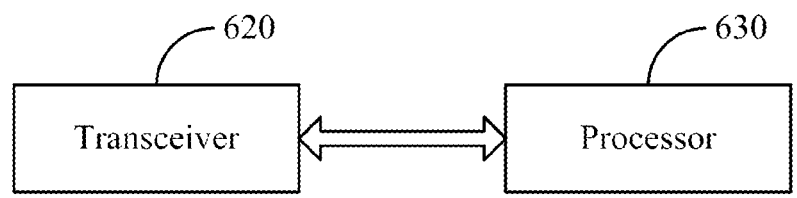

Based upon the same technical idea, as illustrated in FIG. 6B, a network-side device in a system for determining a pre-coding matrix according to another embodiment of the invention can include:

The transceiver 620 is configured to receive a first pre-coding indicator and a second pre-coding indicator from a UE; and processor 630 is configured to determine a pre-coding matrix according to the first pre-coding indicator and the second pre-coding indicator, the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer.

Particularly the processor 630 is configured to determine the first component pre-coding matrix corresponding to the first pre-coding indicator and to determine the second component pre-coding matrix corresponding to the second pre-coding indicator; and to determine that the product of the first component pre-coding matrix and the second component pre-coding matrix is the pre-coding matrix.

Particularly the processor 630 can determine the first component pre-coding matrix corresponding to the first pre-coding indicator in the equation of:

$$W_1 = \begin{bmatrix} Z \otimes X & 0 \\ 0 & Z \otimes X \end{bmatrix} \text{ or}$$

$$W_1 = \begin{bmatrix} Z \otimes X & 0 \\ 0 & Z \otimes XA \end{bmatrix} \text{ or}$$

$$W_1 = \begin{bmatrix} Z \otimes X & 0 \\ 0 & ZB \otimes X \end{bmatrix} \text{ or}$$

$$W_1 = \begin{bmatrix} Z \otimes X & 0 \\ 0 & ZB \otimes XA \end{bmatrix},$$

$W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix with $M_V \times M_V$ dimension, and $M_H$, $D_H$, $D_V$ and $M_V$ represent positive integers.

Preferably X represents an element in a set of beam-forming matrixes $\{X_p : p=0, 1, \ldots, N_H-1,\}$ with $X=X_k$ and $0 \leq k \leq N_H-1$; and Z represents an element in a set of beam-forming matrixes $\{Z_q : q=0, 1, \ldots, N_V-1\}$ with $Z=Z_n$ and $0 \leq n \leq N_V-1$, and $N_H$ and $N_V$ are positive integers, and $n=\lceil i_1/N_H \rceil$; $k=i_1 \bmod N_H$ or $k=\lceil i_1/N_V \rceil$; $n=i_1 \bmod N_V$ and $i_1$ represents the first pre-coding indicator.

Preferably the second component pre-coding matrix is the product of a $(2M_H M_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

$W_2$ represents the second component pre-coding matrix; $e_{k_1}$ represents a column vector with the length of $M_H M_V$ and the $k_i$-th element being 1 and all the other elements being 0; and $\alpha_i$ represents a complex scalar with a modulus being 1, and $M_H$ and $M_V$ represent positive integers, and M represent the power normalization coefficient.

Particularly the processor 630 can determine the first component pre-coding matrix corresponding to the received first pre-coding indicator according to a preset correspondence relationship between the first component pre-coding matrix and the first pre-coding indicator.

Particularly the processor 630 can determine the second component pre-coding matrix corresponding to the received second pre-coding indicator according to a preset correspondence relationship between the second component pre-coding matrix and the second pre-coding indicator.

Particularly the processor 630 can determine the pre-coding matrix corresponding to the received first pre-coding indicator and second pre-coding indicator according to a preset correspondence relationship between the first pre-coding indicator, the second pre-coding indicator and the pre-coding matrix.

Based upon the same inventive idea, an embodiment of the invention further provides a method for transmitting a coding indicator, and since the UE in the system for determining a pre-coding matrix is a device corresponding to this method, and this method addresses the problem under a similar principle to the UE in the system for determining a pre-coding matrix, reference can be made to the implementation of the UE for an implementation of this method, and a repeated description thereof will be omitted here.

Figure 7:
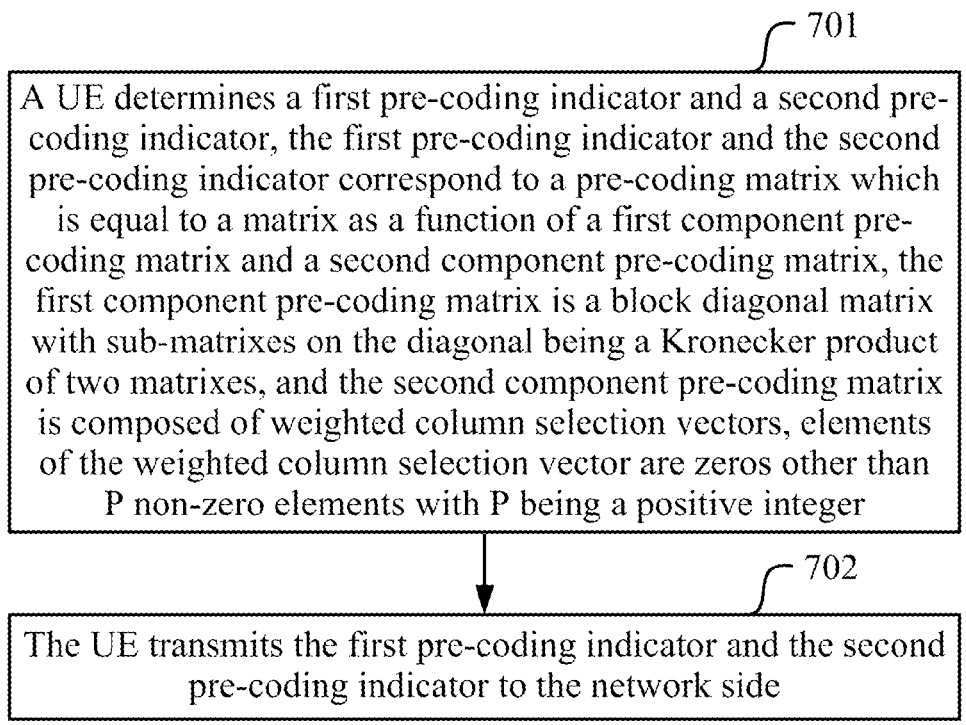
FIG. 7 illustrates a schematic flow chart of a method for transmitting a coding indicator according to an embodiment of the invention.

As illustrated in FIG. 7, a method for transmitting a coding indicator according to an embodiment of the invention includes the following operations:

Operation 701, a UE determines a first pre-coding indicator and a second pre-coding indicator, wherein the first pre-coding indicator and the second pre-coding indicator correspond to a pre-coding matrix which is equal to a matrix as a function of a first component pre-coding matrix and a second component pre-coding matrix, the first component pre-coding matrix is a block diagonal matrix with sub-matrixes on the diagonal being a Kronecker product of two matrices, and the second component pre-coding matrix is composed of weighted column selection vectors, the elements of which are zeros other than P non-zero elements with P being a positive integer; and Operation 702, the UE transmits the first pre-coding indicator and the second pre-coding indicator to the network side.

Preferably P is 2.

In an implementation, the UE can determine the first pre-coding indicator and the second pre-coding indicator in a number of approaches, several of which will be listed below:

In a first approach, the UE selects the first component pre-coding matrix from a set of first component pre-coding matrixes and determines the first pre-coding indicator corresponding to the selected first component pre-coding matrix, and selects the second component pre-coding matrix from a set of second component pre-coding matrixes and determines the second pre-coding indicator corresponding to the selected second component pre-coding matrix.

Particularly the UE estimates a channel of each antenna port to the UE according to a pilot symbol transmitted by the network-side device, each antenna port corresponds to one or more physical antennas; and Then the UE selects the first component pre-coding matrix from the set of first component pre-coding matrixes, and selects the second component pre-coding matrix from the set of second component pre-coding matrixes, according to the estimated channels.

In the first approach, the UE can transmit the first pre-coding indicator and the second pre-coding indicator to the network-side device over the uplink channel by reporting the first pre-coding indicator and the second pre-coding indicator at different time at different time granularities and frequency granularities or at the same time.

In the first approach, the UE can transmit the first pre-coding indicator and the second pre-coding indicator to the network-side device over the uplink channel by reporting the first pre-coding indicator and the second pre-coding indicator at different time at different time granularities and frequency granularities or at the same time.

In an implementation, if the first component pre-coding matrix in the embodiment of the invention is a block diagonal matrix, then the first component pre-coding matrix is expressed in one of Equation 1 to Equation 4.

In the first approach, the set of first component pre-coding matrixes is composed of first component pre-coding matrixes expressed in one of Equation 1 to Equation 4 above; and in the second approach, each first component pre-coding matrix is determined in one of Equation 1 to Equation 4 above.

In the first approach, preferably the UE can determine the first pre-coding indicator in Equation 5 or Equation 6 above after determining the first component pre-coding matrix.

In an implementation, the second component pre-coding matrix is the product of a $(2M_H M_V) \times r$-dimension matrix and a power normalization coefficient, and r represents the number of columns in the pre-coding matrix; and The second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

$W_2$ represents the second component pre-coding matrix; $e_{k_i}$ represent a column vector with the length of $M_H M_V$ and the $k_i$-th element being 1 and all the other elements being 0; and $\alpha_i$ represents a complex scalar with a modulus being 1, and $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

j represents a pure imaginary number, e.g., $$j = e^{j\frac{\pi}{2}}.$$

Here r represents the number of columns in the pre-coding matrix, which is also referred to as a rank.

In the first approach, preferably the UE can determine the second pre-coding indicator corresponding to the second component pre-coding matrix according to a preset correspondence relationship between the second component pre-coding matrix and the second pre-coding indicator after determining the second component pre-coding matrix.

The correspondence relationship between the second component pre-coding matrix and the second pre-coding indicator can be preset as needed. In an implementation, the correspondence relationship can be specified in a protocol or can be signaled in higher-layer signaling.

In the first approach, if the UE selects a plurality of first component pre-coding matrixes from the set of first component pre-coding matrixes and selects one second component pre-coding matrix from the set of second component pre-coding matrixes, then the UE can select one of the plurality of first component pre-coding matrixes according to one of Equation 7 to Equation 10; or if the UE selects a plurality of second component pre-coding matrixes from the set of second component pre-coding matrixes and selects one first component pre-coding matrix from the set of first component pre-coding matrixes, then the UE can select one of the plurality of second component pre-coding matrixes according to one of Equation 7 to Equation 10.

In a second approach, the UE determines at least one pre-coding matrix; determines first pre-coding indicator(s) and second pre-coding indicator(s) corresponding to the at least one pre-coding matrix according to a correspondence relationship between the first pre-coding indicator, the second pre-coding indicator and the pre-coding matrix; and determines that one of the determined first pre-coding indicator(s) and one of the determined second pre-coding indicator(s) are the first pre-coding indicator and the second pre-coding indicator to be signaled to the network side.

If the UE determines a plurality of pre-coding matrixes, then the first pre-coding indicators corresponding to the plurality of pre-coding matrixes determined by the UE are the same.

If the UE determines a plurality of pre-coding matrixes, then the second pre-coding indicators corresponding to the plurality of pre-coding matrixes determined by the UE are different.

The equations in which the first component pre-coding matrix and the second component pre-coding matrix are expressed in the first approach above can also be applicable to the second approach.

Based upon the same inventive idea, an embodiment of the invention further provides a method for determining a pre-coding matrix, and since the network-side device in the system for determining a pre-coding matrix is a device corresponding to this method, and this method addresses the problem under a similar principle to the network-side device in the system for determining a pre-coding matrix, reference can be made to the implementation of the network-side device for an implementation of this method, and a repeated description thereof will be omitted here.

Figure 8:
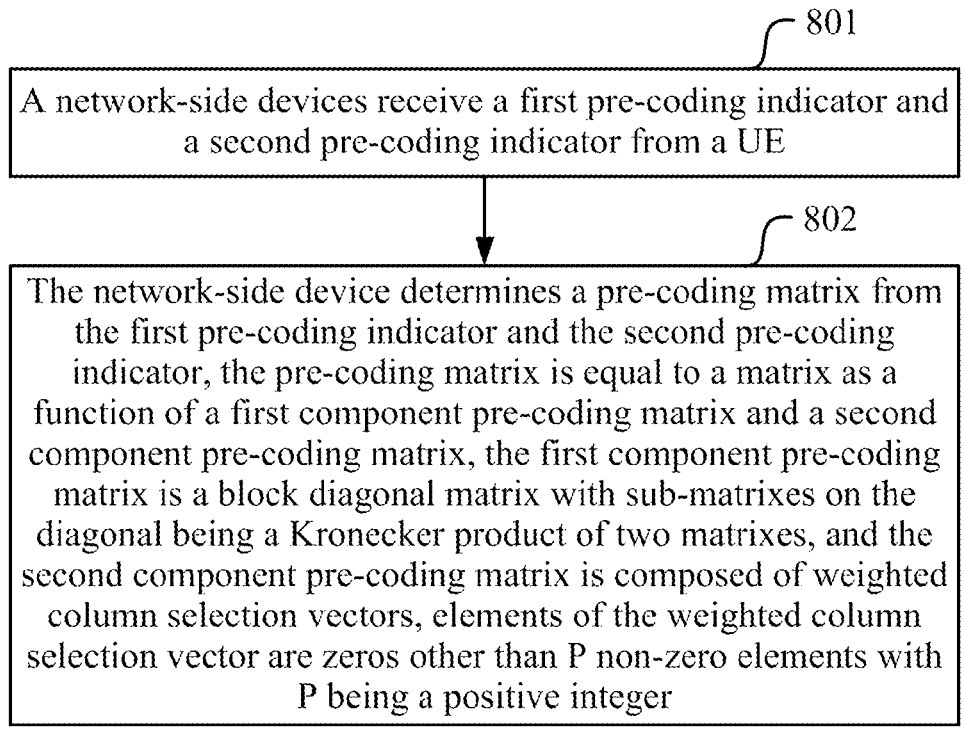
FIG. 8 illustrates a schematic flow chart of a method for determining a pre-coding matrix according to an embodiment of the invention.

As illustrated in FIG. 8, a method for determining a pre-coding matrix according to an embodiment of the invention includes the following operations:

Operation 801, a network-side devices receive a first pre-coding indicator and a second pre-coding indicator from a UE; and Operation 802, the network-side device determines a pre-coding matrix according to the first pre-coding indicator and the second pre-coding indicator, The pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, the element of weighted column selection vector are zeros other than P non-zero elements with P being a positive integer.

The network-side device can determine the pre-coding matrix according to the first pre-coding indicator and the second pre-coding indicator upon reception of the first pre-coding indicator and the second pre-coding indicator from the UE in a number of approaches, several of which will be listed below:

In a first approach, the network-side device determines the first component pre-coding matrix corresponding to the first pre-coding indicator and determines the second component pre-coding matrix corresponding to the second pre-coding indicator; and The network-side device determines the pre-coding matrix in one of Equation 7 to Equation 10.

The network-side device determines the first component pre-coding matrix corresponding to the first pre-coding indicator in one of Equation 1 to Equation 4.

Alternatively the network-side device can determine the first component pre-coding matrix corresponding to the received first pre-coding indicator according to a preset correspondence relationship between the first component pre-coding matrix and the first pre-coding indicator.

The network-side device can determine the second component pre-coding matrix corresponding to the received second pre-coding indicator according to a preset correspondence relationship between the second component pre-coding matrix and the second pre-coding indicator.

If both the UE and the network-side device determine the first component pre-coding matrix in one of Equation 1 to Equation 4, then the particular one equation can be specified in a protocol or can be signaled in higher signaling or can be determined as a result of negotiation between the UE and the network-side device as long as the same equation is applied at the UE and the network-side device.

In a second approach, the network-side device determines the pre-coding matrix corresponding to the received first pre-coding indicator and second pre-coding indicator according to a preset correspondence relationship between the first pre-coding indicator, the second pre-coding indicator and the pre-coding matrix.

The correspondence relationship between the first pre-coding indicator, the second pre-coding indicator and the pre-coding matrix can be preset as needed. In an implementation, the correspondence relationship can be specified in a protocol or can be signaled in higher signaling.

The network-side device preprocesses data transmitted by the UE using the determined pre-coding matrix after determining the pre-coding matrix.

Horizontal and vertical dimensions can be interchangeable in the embodiment of the invention.

In order to make the objects, technical solutions and advantages more apparent, the invention will be described below in further details, and apparently the embodiments as described are merely a part but not all of the embodiments of the invention. All the other embodiments which can occur to those ordinarily skilled in the art from the embodiments here of the invention without any inventive effort shall fall into the scope of the invention as claimed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a pre-coding matrix, the method comprising:
receiving, by a network-side device, a first pre-coding indicator and a second pre-coding indicator from a UE; and
determining, by the network-side device, a pre-coding matrix from the first pre-coding indicator and the second pre-coding indicator, and preprocessing data to be transmitted to the UE using the determined pre-coding matrix,
wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of weighted column selection vector are zeros other than P non-zero elements with P being a positive integer.

2. The method according to claim 1, wherein determining, by the network-side device, the pre-coding matrix comprises:
determining, by the network-side device, the first component pre-coding matrix corresponding to the first pre-coding indicator and determining the second component pre-coding matrix corresponding to the second pre-coding indicator; and
determining, by the network-side device, that a product of the first component pre-coding matrix and the second component pre-coding matrix is the pre-coding matrix;
or,
wherein determining, by the network-side device, the pre-coding matrix comprises:
determining, by the network-side device, the pre-coding matrix corresponding to the received first pre-coding indicator and second pre-coding indicator according to a preset correspondence relationship between the first pre-coding indicator, the second pre-coding indicator and the pre-coding matrix.

3. The method according to claim 2, wherein the network-side device determines the first component pre-coding matrix corresponding to the first pre-coding indicator in the equation of:

$$W_1 = \begin{bmatrix} Z \otimes X & 0 \\ 0 & Z \otimes X \end{bmatrix}, \text{ or}$$

$$W_1 = \begin{bmatrix} Z \otimes X & 0 \\ 0 & Z \otimes XA \end{bmatrix}, \text{ or}$$

$$W_1 = \begin{bmatrix} Z \otimes X & 0 \\ 0 & ZB \otimes X \end{bmatrix}, \text{ or}$$

$$W_1 = \begin{bmatrix} Z \otimes X & 0 \\ 0 & ZB \otimes XA \end{bmatrix},$$

wherein $W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix with $M_V \times M_V$ dimension, wherein $M_H$, $D_H$, $D_V$ and $M_V$ represent positive integers.

4. The method according to claim 2, wherein the second component pre-coding matrix is a product of a $(2M_H M_V) \times r$-dimension matrix and a power normalization coefficient, wherein r represents the number of columns in the pre-coding matrix; and
the network-side device determines the second component pre-coding matrix corresponding to the second pre-coding indicator in the equation of:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

wherein $W_2$ represents the second component pre-coding matrix; $e_{k_i}$ represents a column vector with the length of $M_H M_V$ and the $k_i$-th element being 1 and all the other elements being 0; and $\alpha_i$ represents a complex scalar with a modulus being 1; $M_H$ and $M_V$ represent positive integers; and M represent the power normalization coefficient.

5. A network-side device, comprising:
a transceiver configured to receive a first pre-coding indicator and a second pre-coding indicator from a UE; and
a processor configured to determine a pre-coding matrix from the first pre-coding indicator and the second pre-coding indicator, and preprocess data to be transmitted to the UE using the determined pre-coding matrix,
wherein the pre-coding matrix is equal to a matrix as a function of a first component pre-coding matrix and a second component pre-coding matrix, the first component pre-coding matrix is a block diagonal matrix with sub-matrixes on the diagonal being a Kronecker product of two matrixes, and the second component pre-coding matrix is composed of weighted column selection vectors, elements of the weighted column selection vector are zeros other than P non-zero elements with P being a positive integer.

6. The network-side device according to claim 5, wherein the processor is configured:
to determine the first component pre-coding matrix corresponding to the first pre-coding indicator and to determine the second component pre-coding matrix corresponding to the second pre-coding indicator; and
to determine that a product of the first component pre-coding matrix and the second component pre-coding matrix is the pre-coding matrix;
or,
wherein the processor is configured:
to determine the pre-coding matrix corresponding to the received first pre-coding indicator and second pre-coding indicator according to a preset correspondence relationship between the first pre-coding indicator, the second pre-coding indicator and the pre-coding matrix.

7. The network-side device according to claim 6, wherein the processor is configured to determine the first component pre-coding matrix corresponding to the first pre-coding indicator in the equation of:

$$W_1 = \begin{bmatrix} Z \otimes X & 0 \\ 0 & Z \otimes X \end{bmatrix}, \text{ or}$$

$$W_1 = \begin{bmatrix} Z \otimes X & 0 \\ 0 & Z \otimes XA \end{bmatrix}, \text{ or}$$

$$W_1 = \begin{bmatrix} Z \otimes X & 0 \\ 0 & ZB \otimes X \end{bmatrix}, \text{ or}$$

$$W_1 = \begin{bmatrix} Z \otimes X & 0 \\ 0 & ZB \otimes XA \end{bmatrix},$$

wherein $W_1$ represents the first component pre-coding matrix; X represents a beam-forming matrix with $D_H \times M_H$ dimension; Z represents a beam-forming matrix with $D_V \times M_V$ dimension; A represents a diagonal matrix with $M_H \times M_H$ dimension; and B represents a diagonal matrix with $M_V \times M_V$ dimension, wherein $M_H$, $D_H$, $D_V$ and $M_V$ represent positive integers.

8. The network-side device according to claim 6, wherein the second component pre-coding matrix is a product of a $(2M_H M_V) \times r$-dimension matrix and a power normalization coefficient, wherein r represents the number of columns in the pre-coding matrix, and $M_H$ and $M_V$ represent positive integers, and M represents the power normalization coefficient; and wherein
the second component pre-coding matrix is:

$$W_2 = \begin{bmatrix} e_{k_1} & e_{k_2} & \Lambda & e_{k_r} \\ \alpha_1 e_{k_1} & \alpha_2 e_{k_2} & \Lambda & \alpha_r e_{k_r} \end{bmatrix} M,$$

wherein $W_2$ represents the second component pre-coding matrix; $e_{k_i}$ represents a column vector with the length of $M_H M_V$ and the $k_i$-th element being 1 and all the other elements being 0; and $\alpha_i$ represents a complex scalar with a modulus being 1.

* * * * *